United States Patent
Regan et al.

(10) Patent No.: US 10,151,661 B2
(45) Date of Patent: Dec. 11, 2018

(54) SYSTEM FOR MONITORING THE WEIGHT AND CENTER OF GRAVITY OF A VEHICLE

(71) Applicant: The Boeing Company, Chicago, IL (US)

(72) Inventors: Casey Charles Regan, Corona, CA (US); Stephen William Ayres, Belgrade, MT (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/652,739

(22) Filed: Jul. 18, 2017

(65) Prior Publication Data
US 2017/0315014 A1  Nov. 2, 2017

(51) Int. Cl.
| | | |
|---|---|---|
| *G01M 1/12* | (2006.01) | |
| *B64D 9/00* | (2006.01) | |
| *B64D 11/06* | (2006.01) | |
| *B64D 45/00* | (2006.01) | |
| *B63B 25/00* | (2006.01) | |
| *B63B 27/00* | (2006.01) | |

(52) U.S. Cl.
CPC .............. *G01M 1/122* (2013.01); *B64D 9/00* (2013.01); *B64D 11/06* (2013.01); *B64D 45/00* (2013.01); *G01M 1/125* (2013.01); *B63B 25/00* (2013.01); *B63B 27/00* (2013.01); *Y02T 50/46* (2013.01)

(58) Field of Classification Search
CPC ......... G01M 1/122; B64D 9/00; B64D 43/00; B63B 25/00; B63B 27/00
USPC .......................................................... 701/124
See application file for complete search history.

(56) References Cited

U.S. PATENT DOCUMENTS

| | | | |
|---|---|---|---|
| 3,746,844 A | 7/1973 | Azum et al. | |
| 4,225,926 A | 9/1980 | Wendt | |
| 4,935,885 A | 6/1990 | McHale et al. | |
| 6,227,489 B1 | 5/2001 | Kitamoto et al. | |

(Continued)

FOREIGN PATENT DOCUMENTS

| | | |
|---|---|---|
| EP | 2 730 479 | 5/2014 |
| EP | 2 910 471 | 8/2015 |
| WO | 2015/130572 | 9/2015 |

OTHER PUBLICATIONS

Flamina Del Conte et al., "Flight Beat", http://www.flaminiadelconte.com/#!flightbeat/c12ng, Flaminiadc/Flightbeat, KLM, pp. 1-4 (2014).

(Continued)

*Primary Examiner* — Tan Q Nguyen
(74) *Attorney, Agent, or Firm* — Vivacqua Law

(57) ABSTRACT

A system for determining load distribution of pieces of cargo in a cargo hold of a vehicle may include a plurality of tags, each of the plurality of tags mounted on a different piece of the pieces of cargo in the cargo hold and carrying information indicative of a weight of the different piece of cargo on which it is mounted; a plurality of sensors mounted in a spaced array along a length of the cargo hold, each of the sensors capable of reading from the tags the information indicative of the weights of the pieces of cargo; and a computer connected to receive from the plurality of sensors the information indicative of the weights and information indicative of the locations of the pieces of cargo in the cargo hold, the computer programmed to calculate therefrom a weight and/or center of gravity of the plurality of the pieces of cargo.

20 Claims, 5 Drawing Sheets

(56) References Cited

U.S. PATENT DOCUMENTS

| | | | | |
|---|---|---|---|---|
| 6,275,769 | B1* | 8/2001 | Willis | B64D 43/00 |
| | | | | 244/118.1 |
| 6,308,131 | B1* | 10/2001 | Fox | B64D 9/00 |
| | | | | 177/136 |
| 6,867,702 | B2* | 3/2005 | Huber | B64C 1/20 |
| | | | | 198/781.06 |
| 7,198,227 | B2* | 4/2007 | Olin | B64D 9/00 |
| | | | | 244/118.1 |
| 8,068,975 | B2* | 11/2011 | Jensen | G01G 19/07 |
| | | | | 701/124 |
| 8,195,327 | B2* | 6/2012 | Krantz | B64C 1/20 |
| | | | | 198/782 |
| 8,515,656 | B2* | 8/2013 | Reed | B64D 9/00 |
| | | | | 244/137.1 |
| 8,952,813 | B2* | 2/2015 | Boss | G06Q 10/0832 |
| | | | | 340/10.1 |
| 2002/0055816 | A1* | 5/2002 | H. Chamas | G01G 19/07 |
| | | | | 701/124 |
| 2004/0226996 | A1* | 11/2004 | Stefani | G01G 19/07 |
| | | | | 235/384 |
| 2010/0044515 | A1 | 2/2010 | Neto | |
| 2015/0008709 | A1 | 1/2015 | Erhel | |
| 2016/0121765 | A1 | 5/2016 | Desjardins et al. | |

OTHER PUBLICATIONS

EP, Extended European Search Report; Patent Application No. 16177646.3, 8 pages (dated Jan. 18, 2017).

* cited by examiner

SYSTEM FOR MONITORING THE WEIGHT AND CENTER OF GRAVITY OF A VEHICLE

TECHNICAL FIELD

The present disclosure relates to systems and methods for detecting and calculating the internal load distribution in vehicles and, more particularly, to systems and methods for detecting and calculating the internal load distribution of occupants and cargo in an aircraft, including the weight and/or center of gravity of the aircraft.

BACKGROUND

Accurate weight and balance calculations of a vehicle, and in particular vehicles such as aircraft, are critical to the efficient operation of the vehicle and overall vehicle performance. With respect to aircraft, while the weight and center of gravity of an empty fueled aircraft are known with a high degree of accuracy, the payload weight and center of gravity, which includes cargo and/or passengers, is highly variable and subject to relatively large inaccuracies in measurement of weight and distribution. Because of these inaccuracies, operators of vehicles carrying passengers and/or cargo must curtail their operational weight and vehicle center of gravity envelope in order to protect against the unknown and highly variable passenger and cargo payload weight and balance.

The current solution for determining the weight and balance of an aircraft payload, which includes cargo and passengers, is accomplished by using published standard weights for passengers and for bulk cargo, and/or actual weights for containerized cargo. In some cases, such as with small aircraft, the actual weights and locations of passengers and cargo are used to calculate the center of gravity. However, this approach is inaccurate because of the compounding weight and balance discrepancy for every passenger and piece of cargo. Consequently, operators of the aircraft must curtail the aircraft operating envelope to account for these errors in the weight and balance. This reduces the capacity and efficiency of the aircraft, requiring increased and unnecessary fuel burn, decreased range or payload capability, limited loading flexibility, and exposure to on-ground aft tipping during loading and unloading of cargo and/or passengers.

Cargo operators also may employ an on-board weight and balance system (OBWBS) that detects the nose gear oleo extension and warns ground crews when aircraft tipping is imminent. However, this system is conservative and thereby greatly restricts the loading flexibility for the cargo operators. There is currently no system that can actively monitor and determine the weight and center of gravity of the payload with accuracy sufficient to eliminate the reduced operational weight and balance envelope. The OBWS is not accurate enough to allow the operators the flexibility to offload cargo and passengers quickly before potentially tripping the current overly conservative tip alarm.

Currently, the weight and center of gravity of the occupants or passengers of an aircraft may be approximated by the airline using information from the airline reservation and ticketing system. In some cases, flight attendants must perform a manual count of passengers seated on the aircraft. The flight attendants walk through the cabin and manually count the number of adults and children in every zone. This count of adults and children is converted to a rough passenger weight per predetermined location or zone, which is calculated and then entered into the flight management computer (FMC) by the flight crew. Such a manual process can be inaccurate, and is time consuming, which can delay the turnaround time of the aircraft. Accordingly, there is a need for a system and method for rapidly and accurately calculating the passenger weight and center of gravity of an aircraft.

SUMMARY

The disclosed system for monitoring the weight and/or center of gravity of a vehicle provides full-time monitoring and calculation of the resultant weight and/or center of gravity of the cargo in the cargo hold. Coupled with an occupant sensor system, which provides full-time monitoring and calculation of the weight and/or center of gravity of the passenger load of the vehicle, the complete vehicle weight and/or center of gravity can be measured in real time, and if desired, continuously. An on-ground tipping alarm also is incorporated in embodiments.

In an exemplary embodiment, the disclosed system consists of four elements. The first element is a series of seat sensors installed in the passenger seats. Each of these sensors detects whether its associated seat is occupied or empty, and transmits a signal to a computer. The second element is a series of radio-frequency identification (RFID) readers installed in the cargo hold(s) of the vehicle. The readers detect and transmit the location of each piece of cargo by reading RFID tags attached to each of the pieces of cargo, based on proximity to each reader and weight information carried by the tags to the computer.

The third element is the computer and its associated software. The computer uses the information received from the RFID readers to compute the passenger weight and/or center of gravity based on the data from the seat sensors, and compute the cargo weight and/or center of gravity based on the data from the RFID tags, relayed through the RFID reader. In embodiments, these weights and/or centers of gravity are combined and a total passenger/cargo weight and/or center of gravity is calculated. The software can be hosted on the existing cabin system control panel (CSCP), and in embodiments includes software that generates an alarm when a weight imbalance is detected. The fourth element of the system is an auditory warning to alert attendants and ground crew that the center of gravity has shifted at or aft of a predetermined distance from a reference plane, and action must be taken to ensure the vehicle, such as an aircraft, does not tip aft.

In another exemplary embodiment, a system for determining load distribution of pieces of cargo in a cargo hold of a vehicle includes a plurality of tags, each of the plurality of tags mounted on a different piece of the pieces of cargo in the cargo hold and carrying information indicative of a weight of the different piece of cargo on which it is mounted; a plurality of sensors mounted in a spaced array along a length of the cargo hold, each of the sensors capable of reading from the tags the information indicative of the weights of the pieces of cargo; and a computer connected to receive from the plurality of sensors the information indicative of the weights and information indicative of the locations of the pieces of cargo in the cargo hold, the computer programmed to calculate therefrom a center of gravity of the plurality of the pieces of cargo.

In yet another exemplary embodiment, a system for determining load distribution of pieces of cargo in a cargo hold of an aircraft, includes a plurality of radio frequency identification (RFID) readers mounted in a spaced array along a length of the cargo hold, each of the RFID readers capable of reading from radio frequency identification (RFID) tags associated with a different piece of the pieces of cargo in the cargo hold information indicative of the weights of the pieces of cargo in the cargo hold; and a computer connected to receive from subsets of the plurality of RFID readers the information indicative of the weight and location of each one of the pieces of cargo in the cargo hold, and the computer programmed to calculate a center of gravity of the plurality of the pieces of cargo in the cargo hold from the weights of each of the pieces of cargo received from the subsets of the plurality of RFID readers, and the distances of each of the pieces of cargo from a reference plane as indicated by each of the subsets of the plurality of RFID readers reading the associated RFID tags of each of the pieces of cargo.

In still another exemplary embodiment, a method of making a system to detect a load distribution of pieces of cargo in a cargo hold of a vehicle includes selecting a plurality of sensors that read information carried on tags indicative of weights of pieces of cargo on which the tags are mounted; mounting the plurality of sensors in a spaced array along a length of the cargo hold, such that each of the sensors is at a known distance from a reference plane of the vehicle; connecting a computer to receive from the plurality of sensors the information indicative of the weights and information indicative of the locations of the pieces of cargo in the cargo hold; and programming the computer to calculate from the information indicative of the weights and information indicative of the locations of the pieces of cargo in the cargo hold a center of gravity of the plurality of the pieces of cargo.

Other objects and advantages of the disclosed system for monitoring the weight and/or center of gravity of a vehicle will be apparent from the following description, the accompanying drawings, and the appended claims.

DETAILED DESCRIPTION

Figure 1:
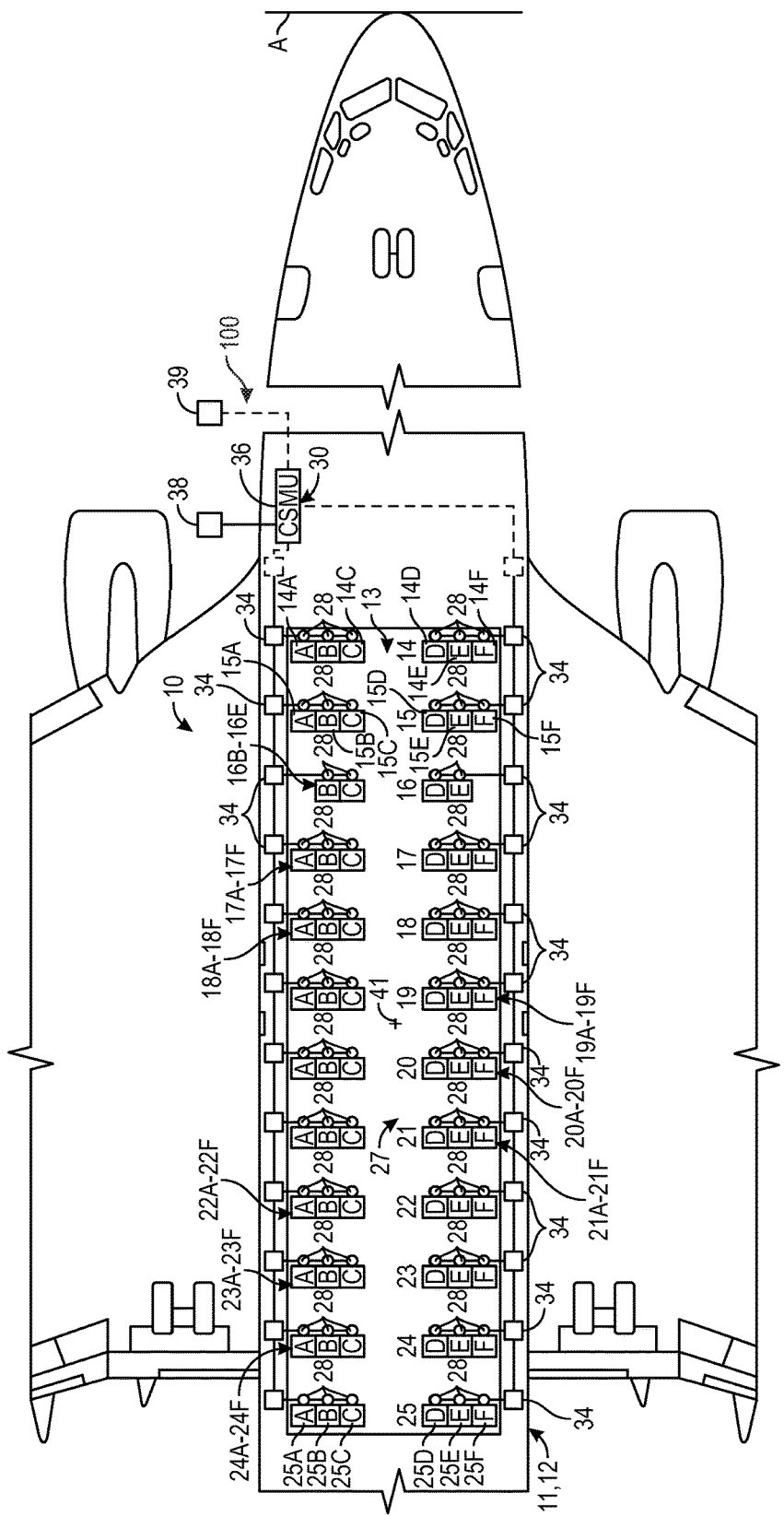
FIG. 1 is a schematic top plan view of a passenger vehicle in the form of an aircraft, showing an exemplary embodiment of the vehicle occupant sensor system of the disclosed system for monitoring the center of gravity of a vehicle.

As shown in FIG. 1, an exemplary embodiment of the system for monitoring the weight and/or center of gravity of a vehicle, generally designated 100, includes a vehicle occupant sensor system for determining an occupant load distribution, generally designated 10, may be incorporated in a vehicle such as a fixed-wing aircraft, and in particular a commercial passenger aircraft 11. Other types of vehicles include lighter than air aircraft, hovercraft, rotary-wing aircraft, marine vessels, submarine vessels, amphibious vehicles, and land vehicles.

The aircraft 11 may have a fuselage 12 enclosing a passenger cabin 13 having a plurality of passenger seats 14A-14F, 15A-15F, 16B-16E, 17A-17F, 18A-18F, 19A-19F, 20A-20F, 21A-21F, 22A-22F, 23A-23F, 24A-24F, and 25A-25F. In other embodiments, the aircraft 12 may have a greater number or a fewer number of passenger seats. Aircraft 11 also may have a greater number of aisles than shown. In the aircraft 11 shown, the passenger seats 14A-14F through 25A-25F may be grouped in rows of six seats across, in which an aisle 27 may separate each row of seats into groupings of three seats A-C and D-F (except for row 16, which may function as an exit row having seats 16B and 16C on one side of aisle 27, and 16D and 16E on the other side of the aisle.

The system 10 may include a plurality of sensors 28, in which each of the plurality of sensors is associated with a different one of the plurality of passenger seats 14A-25F for detecting an occupant or passenger (the terms "occupant" and "passenger" being used herein interchangeably) in each of the plurality of passenger seats, and a weight of the detected occupant. The plurality of sensors 28 may be load sensors. The sensors 28 may be connected to a computer, generally designated 30, that may receive data from each of the plurality of sensors indicative of the weight and passenger seat location in the vehicle or aircraft 11 of the detected occupant (not shown) in each of the plurality of passenger seats. As will be described in greater detail, the computer 30 may calculate from that data the total weight and the center of gravity of the detected occupants in the plurality of passenger seats 28.

In an exemplary embodiment, the computer 30 may activate a visual and/or audio alarm if a center of gravity 41 of the passengers shifts beyond a predetermined location in the aircraft 11. Also in an embodiment, the computer 30 may activate a visual and/or audio alarm when the center of gravity 41 shifts aft of the aircraft beyond a predetermined distance from a reference plane A. Although reference plane A is shown tangent to the nose of the fuselage of the aircraft 11, it may be at any point along the longitudinal axis. Also in an embodiment, the computer 30 may calculate the weight and/or center of gravity 41 a plurality of times during one or both of occupant loading of the aircraft 11, and occupant unloading of the aircraft.

Figure 2:
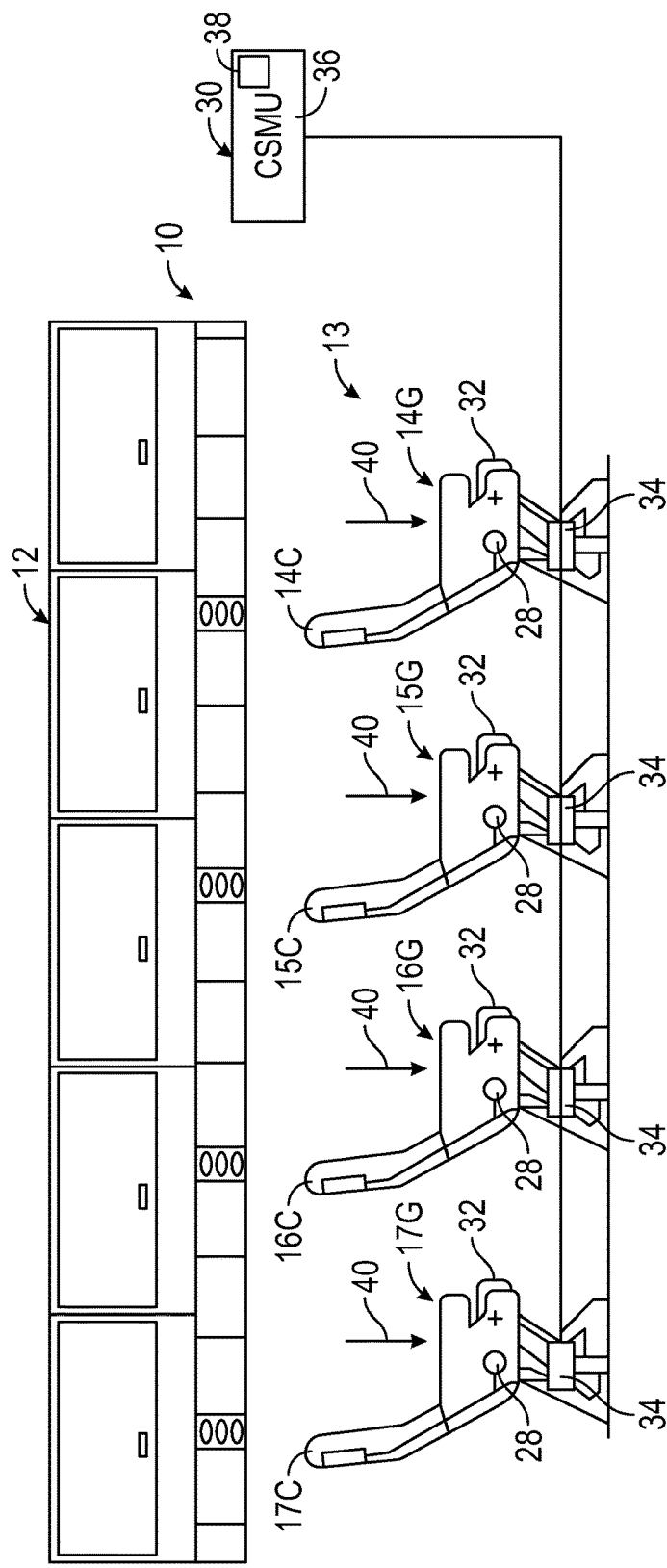
FIG. 2 is a side elevation of a portion of the passenger cabin of the aircraft of FIG. 1.

As shown in FIGS. 1 and 2, in an embodiment, each of the plurality of sensors 28 may be integrated into either a seat cushion or a seat bottom 32 of a different one of the plurality of passenger seats 14A-25F of the aircraft 11. Also in an embodiment, each of the plurality of sensors 28 may be connected to a seat electronics unit 34 located in a seat group 14G, 15G, 16G, 17G (FIG. 2) associated with the plurality of passenger seats 14A-25F. For example, seat group 14G may include seats 14A, 14B, and 14C, (FIG. 1), seat group 15G may include seats 15A, 15B, and 15C, seat group 16G may include seats 16A, 16B, and 16C, seat group 17G may include seats 17A, 17B, and 17C, and so on for some or all of the seats of the aircraft 11.

In an embodiment, the seat electronics units 34 of the seats 14A-25F may be connected to the computer 30. In an embodiment, the computer 30 may include a cabin system management unit (CSMU) 36 and a cabin system control panel (CSCP) 38. In the embodiment of FIGS. 1 and 2, existing seat-to-seat cables may provide the power and data wire for transmitting information from the sensors 28 to the cabin system management unit 36, which in an embodiment may be located at the front of the aircraft 11. The information received from the sensors 28 may be visually displayed on the CSCP 38 for flight attendants to record and communicate to the flight crew. Alternatively, the system 10 may include a remote alarm 39, which may include a visual and/or audio alarm, that may alert baggage handlers if the center of gravity shifts aft of the aircraft 12 beyond a predetermined distance from a reference plane A. The remote alarm 39 may be located on the aircraft 11 in or near a baggage handling compartment, on a baggage-conveying vehicle that services the aircraft, and/or worn by baggage-handling personnel. The alarm 39 may be connected to receive an alarm signal from the computer 30 either by wire or wirelessly.

In an embodiment, each of the sensors 28 may be configured to transmit one of three signals. When the applied load from a passenger or occupant 40 (represented by heavy arrows in FIG. 2) is less than a first threshold, which in an embodiment may be 28 pounds (12.7 kg.), or one of the seats 14A-25F is unoccupied, the sensor 28 of that seat may transmit a first or "zero weight" signal to the cabin system management unit 36. Any load under the first threshold of 28 pounds will be considered negligible.

When the occupant load on one of the seats 14A-25F is above the first threshold, which may be 28 pounds, but less than a second threshold, which in an embodiment may be 100 pounds (45.5 kg.), the sensor 28 may transmit a second or in an embodiment an "87 pound weight" ("39.5 kg. weight") signal to the cabin system management unit 36. This range may capture the average weight of a male or female child from ages 2 to 13. The FAA (Federal Aviation Administration) standard average passenger weight of a child between 2 and 13 years of age is 87 pounds in winter and includes 10 pounds (4.5 kg.) for winter clothing and a 16 pound (7.3 kg.) allowance for personal items and carry-on bags. This standard is set forth in FAA AC 120-27E.

When the occupant load on one of the seats 14A-25F detected by the sensor 28 is above the second threshold, which in an embodiment may be greater than 100 pounds, the sensor transmits a third signal, which in an embodiment may be a "195 pound weight" ("88.6 kg. weight") signal to the CSMU 36. A weight of 195 pounds is the FAA standard passenger weight of an average adult during winter months. This too may include a 10 pound allowance for winter clothing and a 16 pound allowance for personal items and carry-on bags. The average weight during winter months is more conservative than the summer months due to an assumed winter clothing allowance. Using these forces at every given seat location 14A-25F, additional software in the CSMU 36 may calculate a total passenger weight and/or center of gravity by calculating the moments produced by every passenger 40 and dividing by the total calculated passenger weight. This weight and center of gravity either may be displayed on the CSCP 38 or transmitted directly to the flight management computer (FMC) for calculating the total passenger/occupant weight and center of gravity 41. The system 10 may reduce airplane turnaround times while improving passenger weight and center of gravity determination accuracy. During unloading of the aircraft 12, the system 10 may provide a way to actively monitor passenger center of gravity movement, which may warn ground operations and flight teams in the event of a possible airplane weight imbalance.

Figure 4:
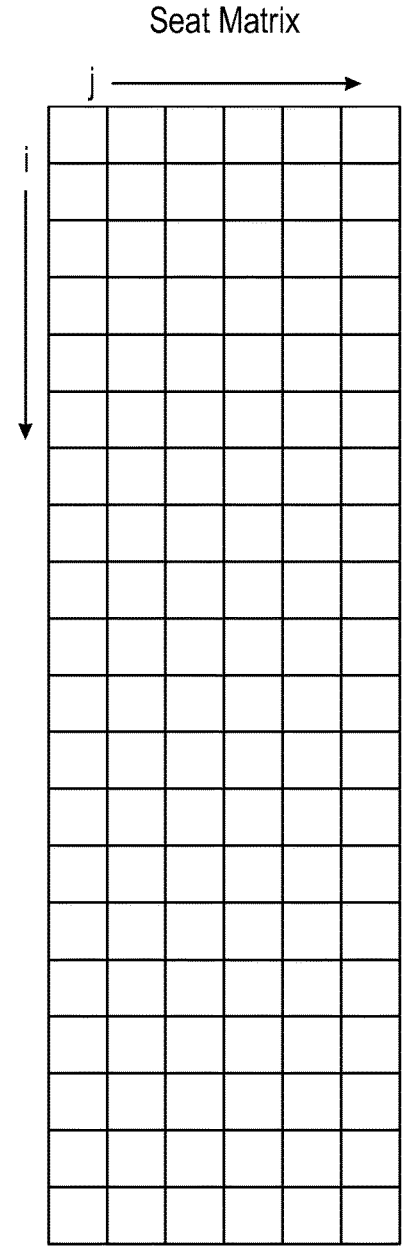
FIG. 4 is a representative seat matrix of a formula used to calculate a passenger weight and/or center of gravity.

In an exemplary embodiment, the cabin system management unit 36 may calculate the center of gravity 41 (see FIG. 1) as follows. As shown in FIG. 4, the seats 14A-25F may be represented by a grid or matrix having j seats across and i rows of seats from front to back of the aircraft 12. The location of a seat $x_i$ row may be calculated using the following equation:

$$x_i = d + p(i-1)$$

where x is the moment arm of the $i^{th}$ row (in inches), d is the distance from the reference plane A to the first row of seats (in inches), and p is the seat pitch in inches. The total passenger weight may be calculated as follows:

$$w_{Total} = \sum_{i,j=1}^{n} w_{ij}$$

where $w_{i,j}$ is the weight of a passenger transmitted by a sensor 28 at a seat at location i, j on the matrix of FIG. 4. Thus, the passenger/occupant center of gravity $CG_{PAX}$ may be calculated as follows:

$$CG_{PAX} = \frac{\sum_{i,j=1}^{n}(w_{ij} \cdot x_i)}{w_{Total}}$$

Figure 3:
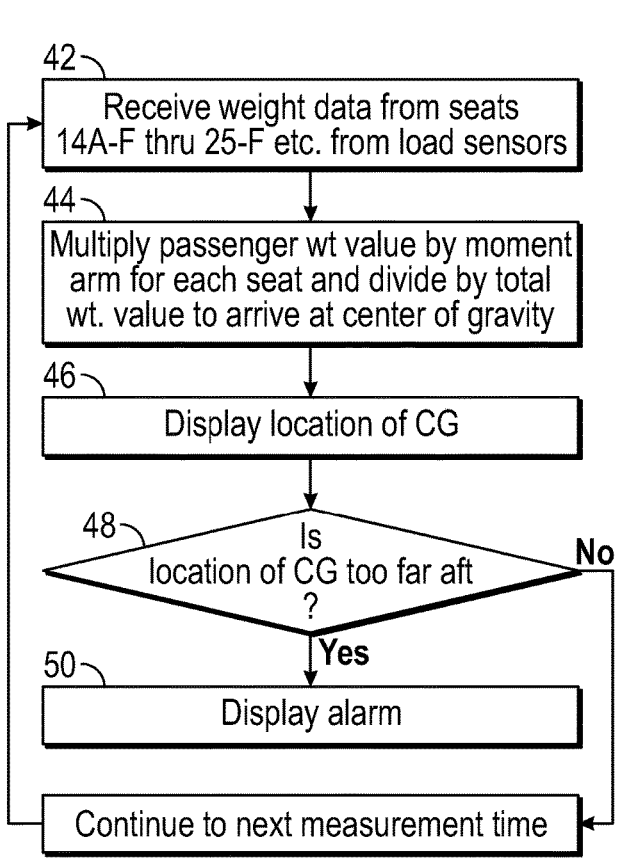
FIG. 3 is a flow chart of an exemplary embodiment of the disclosed vehicle occupant sensor method.

As shown in FIG. 3, in an embodiment, the computer 30 may calculate the center of gravity 41 using the foregoing equations in the following process. As shown in block 42, the computer 30 (or CSMU 36) may receive weight and seat location data from seats 14A-14F through 25A-25F (in embodiments, from some or all of the seats on the aircraft 12 in FIG. 1) from the load sensors 28 embedded in the cushions 32 of each seat (see FIG. 2). As shown in block 44, the weight data and position data from the load sensors 28 received by the cabin system management unit 36 of the computer 30 may be used by the computer to calculate an occupant center of gravity value by multiplying the passenger weight by the moment arm for each of the seats 14A-25F and dividing by the total weight value to arrive at a location of the center of gravity 41 of the occupants (FIG. 1) in the cabin 13 of the aircraft 12 as a distance from the reference plane A.

As shown in block 46, the location of the center of gravity 41 and total weight may be displayed on the cabin system control panel 38, which may be part of the computer 30 (FIG. 1). As shown in block 48, if the location of the center of gravity 41 of the occupants is too far aft of the reference plane A, an alarm may be displayed, as indicated by block 50. If an alarm is not displayed, the computer 30 may continue monitoring the location of the center of gravity 41 of the occupants in the cabin 13 of the aircraft 12 during a passenger loading and/or a passenger unloading procedure. In embodiments, the aforementioned computer routine may be performed automatically as the aircraft 12 is being loaded or unloaded, or may be prompted by a member of the flight crew.

In an embodiment, the sensors 28 may transmit a first signal if the weight of the occupant 40 in an associated one of the plurality of passenger seats 14A-25F is below 28 pounds, a second signal if the weight of the occupant of an associated one of the plurality of passenger seats is between 28 pounds and less than 100 pounds, and a third signal if the weight of the occupant of an associated one of the plurality of passenger seats is 100 pounds or greater. And, in embodiments discussed previously, the first signal may be transmitted as zero pounds, the second signal transmitted as 87 pounds, and the third signal transmitted as 195 pounds. Also in an embodiment, as indicated in block 50, the alarm 39 also may notify baggage handlers loading and/or unloading baggage from the aircraft 12 to stop loading or unloading cargo from the aircraft 12 if the computer 30 detects an airplane weight imbalance condition resulting from the location of the center of gravity 41 of the occupants.

The described vehicle occupant sensor system 10 and method provides advantages over manual systems. The method for calculating the weight and/or center of gravity by utilizing sensors 28 embedded in each of the seats 14A-25F of an aircraft, is more accurate than the airline reservation system or manual estimations made by crew members. The automated calculation of the weight and/or center of gravity is more rapid and more precise than manual calculations. Further, the system 10 may provide alarms that are communicated to flight crew, and baggage handlers to avoid an undesirable imbalance in the aircraft center of gravity relative to a predetermined reference plane A, which may be at the nose of the aircraft 11.

Figure 5:
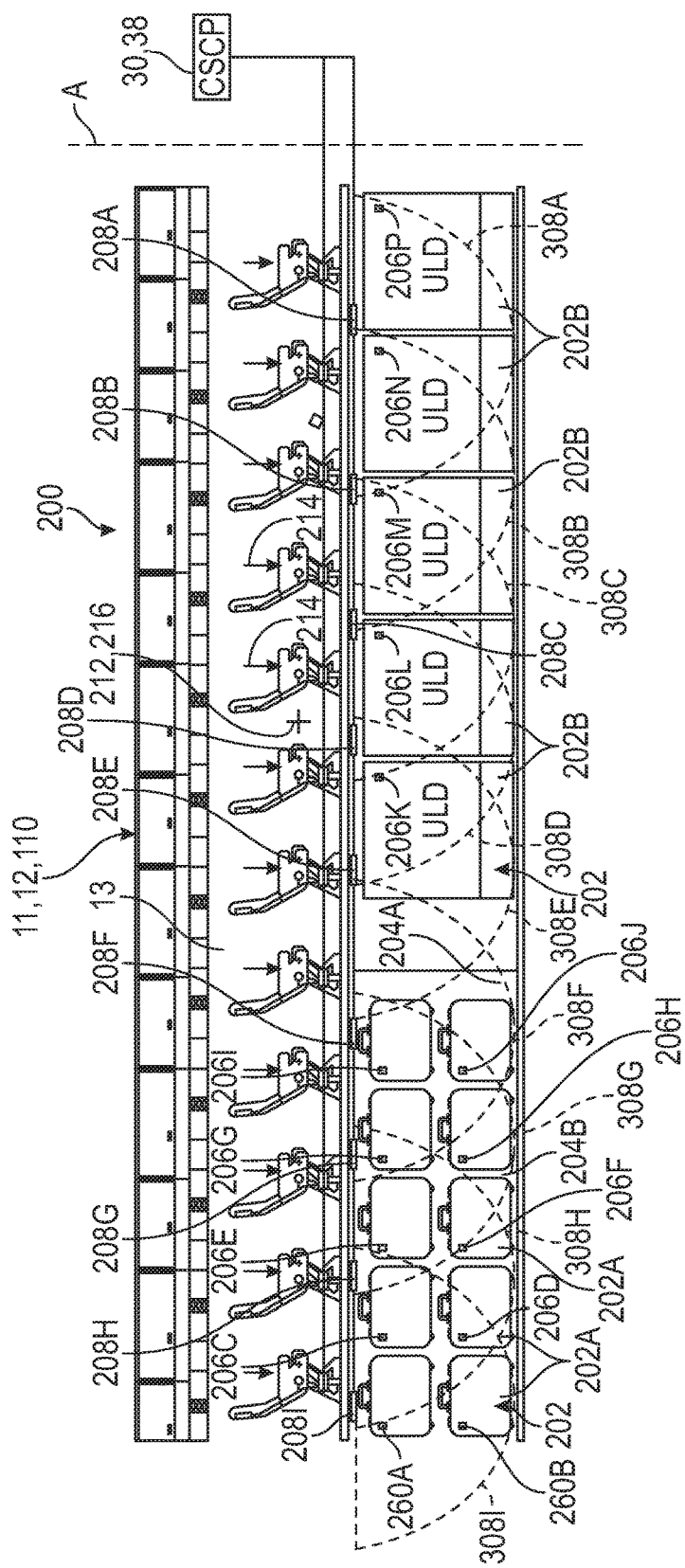
FIG. 5 is a schematic side elevational view of a passenger vehicle in the form of an aircraft.

As shown in FIG. 5, in an exemplary embodiment, the system 100 for monitoring the weight and/or center of gravity of a vehicle also includes a system, generally designated 200, for determining load distribution of pieces of cargo 202 in a cargo hold 204 of the vehicle 11. The cargo hold 204 may consist of a forward cargo hold 204A and an aft cargo hold 204B. The cargo 202 includes individual items of cargo, such as luggage 202A, and/or luggage and other cargo items that have been loaded into unit load devices (ULDs) 202B prior to being placed in the cargo hold 204, which in embodiments may be contoured half width or full width ULDs.

The system 200 utilizes a plurality of tags 206A-206P. Each of the plurality of tags 206A-206P is mounted on or attached to a different piece of the pieces of cargo 202 in the cargo hold 204 and carries information indicative of a weight of the different piece of cargo 202 on which it is mounted. A plurality of sensors 208A-208I is mounted in a spaced array along a length of the cargo hold 204. Each of the sensors 208A-208I is capable of reading from the tags 206A-206P the information indicative of the weights of the pieces of cargo.

A computer 30, which may comprise or include the CSCP 38, is connected to receive from the plurality of sensors 208A-208D the information indicative of the weights and information indicative of the locations of the pieces of cargo 202 in the cargo hold 204. As will be described, computer 30 is programmed to calculate therefrom a weight and/or center of gravity 210 of the plurality of the pieces of cargo 202. In exemplary embodiments, the computer 30 is programmed to calculate the weight and/or center of gravity 210 in real time a plurality of times during one or both of cargo loading of the vehicle 11 and cargo unloading of the vehicle. The computer 30 is programmed to actuate an alarm, which may be part of the computer or CSCP 38, when the center of gravity 210 shifts beyond a predetermined location on the vehicle 11.

In an exemplary embodiment, the tags 206A-206P are radio frequency identification (RFID) tags, and the sensors 208A-208I are RFID interrogators. An example of such an RFID interrogator is the Model 1126 Desktop UHF RFID Reader sold by Technology Solutions (UK) Ltd. of Leicestershire, United Kingdom. In an exemplary embodiment, each of the plurality of tags 206A-206P carries information indicative of a weight range of the different piece of cargo 202 on which it is mounted. For example, a tag 206 may carry information indicating that it is attached to a piece of cargo 202, such as luggage pieces 202A-202B that it is either less than 10 lbs., between 10 lbs. and 30 lbs., or between 30 lbs. and 50 lbs. or more. In the case of cargo 202 in the form of ULDs 202B, the tags 206K-206P may indicate that the ULD to which it is attached is either less than 200 lbs., between 200 lbs. and 400 lbs. or between 400 lbs and 600 lbs. In other exemplary embodiments, the tags 206 may carry information on the actual weight of the piece of cargo 202 to which it is attached. This may be accomplished by weighing each piece of cargo 202 and attaching a tag 206 that carries that weight information. Alternatively, each tag may carry a unique alphanumeric code and that code is associated in a central computer with the weight, or weight range, of the piece of cargo 202 to which it is attached. That paired information is stored in the computer 30.

Each of the plurality of sensors 208A-208I is positioned along the length of the cargo hold 204, or in embodiments the lengths of fore and aft cargo holds 204A, 204B, respectively, a known distance from a reference plane A, and the sensors are located and adjusted such that each of the sensors reads the information indicative of the weights of the pieces of cargo 202 from fewer than all of the pieces of cargo. The computer 30 is programmed to approximate a longitudinal location of each of the pieces of cargo 202 from identification of each of the pieces of cargo by specific ones of the sensors 208, and the known locations of the specific ones of the sensors in the cargo hold 204.

As shown in FIG. 5, each of the sensors 208A-208I has an associated sensitivity range represented by corresponding spherical fields 308A-308I, respectively. Adjacent ones of the fields 308 overlap, such that tag 206M, for example, falls in fields 308A, 308B, and 308C, and is therefore detected by an odd number of sensors 208A, 208B, and 208C, respectively. Tag 206C is located within fields 308H and 308I, and is therefore detected by an even number of sensors 208H and 208I.

The computer 30 is programmed to determine a location of a specific piece of cargo 202 to be between a fore-most and an aft-most one of the plurality of sensors 208 detecting the specific piece of cargo if an even number of the plurality of sensors detects the specific piece of cargo. The computer 30 is also programmed to determine a location of a specific piece of cargo 202 to be at a mid-point sensor location of the ones of the plurality of sensors detecting the specific piece of luggage when an odd number of the plurality of sensors detect the specific piece of cargo.

Therefore, the computer 30 determines the location of the tag 206M, and its associated piece of cargo 202B (shown in the form of a ULD), as at, or approximately at, the location of sensor 208B, the middle sensor of the three sensors detecting tag 206M in the cargo hold 204A. Computer 30 determines the location of the tag 206C, and its associated piece of cargo 202A (shown in the form of a piece of luggage) as at, or approximately at, the mid-point between sensors 208H and 208I in the cargo hold 204B.

In embodiments, computer 30 is programmed to calculate a combined weight and/or center of gravity 212 of the passengers (represented by arrows 214) of the vehicle 11 and the cargo 202 of the vehicle. In other embodiments, the computer 30 is programmed to calculate the combined weight and/or center of gravity 212 of the passengers 214 of the vehicle 11 and the cargo 202 of the vehicle a plurality of times during one or both of occupant and cargo loading of the vehicle and occupant and cargo unloading of the vehicle. In still other embodiments, the computer 30 is programmed to calculate a center of gravity 216 of the vehicle 11 utilizing the center of gravity of the dry operating weight of the vehicle, the center of gravity of the weights of all passengers 214 and carry-on baggage on the vehicle, the combined center of gravity of all of the cargo 202 in the cargo hold 204, and the center of gravity of the total fuel weight.

The total weight of the vehicle 11, such as an aircraft, may be calculated as follows:

$$W_{Total} = W_{DOW} + W_{PAX} + W_C + W_F$$

where $W_{DOW}$ is the dry operating weight of the aircraft, $W_{PAX}$ is the weight of the passengers 214 and carry-on baggage, $W_C$ is the combined weight of all cargo 202 in the cargo hold 204, and $W_F$ is the total fuel weight. The resultant center of gravity for 216 the aircraft may be calculated as follows:

$$CG_{Total} = \frac{[(W_{DOW} * CG_{DOW}) + (W_{PAX} * CG_{PAX}) + (W_C * CG_C) + (W_F * CG_F)]}{W_{total}}$$

where $CG_{DOW}$ is the center of gravity of the dry operating weight of the aircraft, $CG_{PAX}$ is the center of gravity of the weight of all passengers 214 and carry-on baggage, $CG_C$ is the combined center of gravity of the weight of all cargo 202 in the cargo hold 204, and $CG_F$ is the center of gravity of the total fuel weight. The dry operating weight and center of gravity are a known value for a given airplane on a given mission type. The fuel weight and center of gravity are calculated from the airplane's fuel quantity indication system and flight management computer. The passenger and baggage weight and center of gravity are very dynamic during loading and unloading and therefore must be actively calculated using the occupant sensor system described with reference to FIGS. 1-4. Likewise, the weight of the cargo 204 and center of gravity are dynamic during loading and unloading of the vehicle 11 and must rely on the system 200 to be accurately calculated. The total weight of the cargo 202 may be calculated as follows:

$$W_C = \sum_{i=1}^{n} w_i$$

where $w_i$ is the weight of the ith piece of cargo 202 loaded into the cargo hold 204 and detected by the sensors 208A-208I. While duplicate interrogators may read a tag 206, each tag may be identified with a unique serial number, thereby ensuring that the computer 30 summing the cargo weight only counts the ith tag once. The total cargo center of gravity (CG) 210 may be calculated as follows:

$$CG_C = \frac{\sum_{i=1}^{n} (w_i \cdot x_i)}{W_C}$$

where $x_i$ is the longitudinal location of the ith piece of cargo 202, measured in balance arm from the reference plane A of the vehicle 11. The longitudinal location of every piece of cargo 202 is approximated by the computer 30 based on the positive identification of specific sensors 208, such as RFID interrogators, and their known locations in the cargo hold 204. When an even number of sensors detects the same tag 206, such as an RFID tag, the computer 30 determines the location to be between the fore-most and aft-most interrogator, as described previously. When an odd number of sensors 208 detects the same tag 206, the computer 30 determines the location to be at the mid-point sensor location.

In a particular embodiment, the system 200 for determining load distribution of pieces of cargo 202 in a cargo hold 202 of an aircraft 110 includes a plurality of sensors in the form of radio frequency identification (RFID) readers 208A-208I mounted in a spaced array along a length of the cargo hold 202A, 202B, each of the RFID readers capable of reading from radio frequency identification (RFID) tags 206A-206P associated with a different piece of the pieces of cargo in the cargo hold information indicative of the weights of the pieces of cargo in the cargo hold. A computer 30 is connected, either wirelessly or hardwired, to receive from subsets of the plurality of RFID readers 208 the information indicative of the weight and location of each one of the pieces of cargo 202 in the cargo hold 204A, 204B. The computer 30 is programmed to calculate a center of gravity 210 of the plurality of the pieces of cargo 202 in the cargo hold 204A, 204B from the weights of each of the pieces of cargo received from the subsets of the plurality of RFID readers, and the distances of each of the pieces of cargo from a reference plane A as indicated by each of the subsets of the plurality of sensors reading the associated tags of each of the pieces of cargo.

Figure 6:
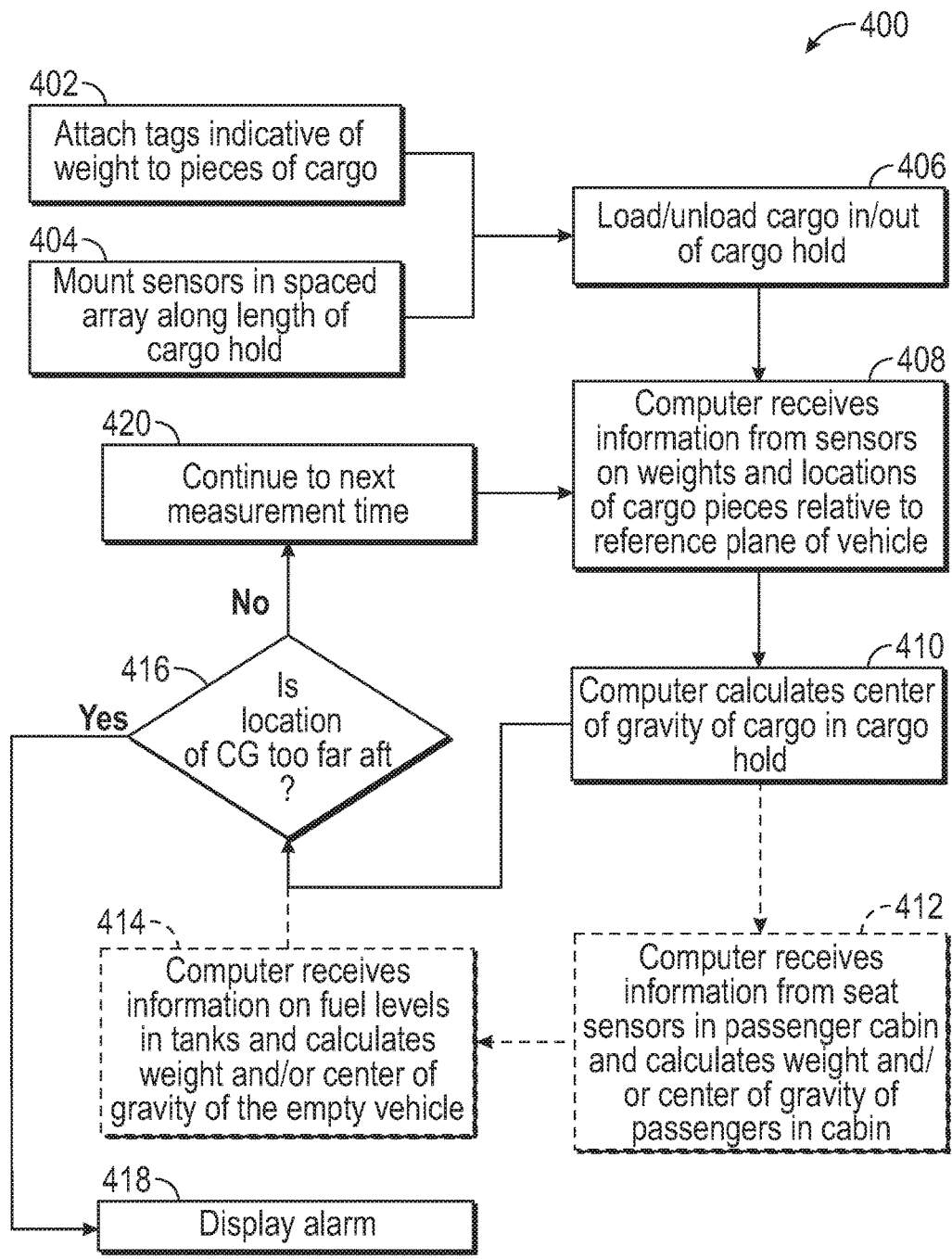
FIG. 6 is a flow chart of an exemplary embodiment of the disclosed method for monitoring the weight and/or center of gravity of a vehicle.

As shown in FIG. 6, a method, generally designated 400, of making and using the system 200 (FIG. 5) to detect a load distribution of pieces of cargo 202 in a cargo hold of a vehicle begins by attaching or associating a plurality of tags 206, such as RFID tags, to pieces of cargo 202 indicative of the weight of the associated piece of cargo, as shown in block 402. As shown in block 404, a plurality of sensors 208, such as RFID readers, that read information carried on the tags 206 indicative of weights of pieces of cargo 202 on which the tags are mounted is selected and mounted in a spaced array along a length of the cargo hold 204, such that each of the sensors is at a known distance from a reference plane of the vehicle. Also included in block 404 is connecting a computer 30 to receive from the plurality of sensors 208 the information indicative of the weights and information indicative of the locations of the pieces of cargo in the cargo hold.

The computer 30 is programmed to calculate from the information indicative of the weights and information indicative of the locations of the pieces of cargo 202 in the cargo hold 204 a center of gravity 210 of the plurality of the pieces of cargo. As shown in block 406, the pieces of cargo 202 are loaded or unloaded into the cargo hold 204. As shown in block 408, the computer 30 receives information from the sensors 208 on weights and locations of the pieces of cargo 202 in the cargo hold 204 relative to the reference plane A of the vehicle. From this, as shown in block 410, the computer 30 calculates the weight and/or center of gravity of the cargo 202 in the cargo hold 204.

Optionally, as shown in block 412, the computer can receive information from seat sensors 28 (FIG. 2) in the passenger cabin 13 and calculate weight and/or the center of gravity of the passengers in the cabin. Also optionally, as shown in block 414, the computer 30 can receive information on fuel levels in vehicle fuel tanks and calculate the weight and/or center of gravity of the vehicle under a given fuel load. As shown in decision diamond 416, the computer 30 then determines whether the center of gravity 210, 212, 216 is too far aft of reference plane A. If it is, as indicated in block 418, an alarm is activated, which may be a display on the CSCP, and/or an audible or other visual alarm. If it is not, then, as shown in block 420, the computer continues to the next measurement time after a predetermined time interval, to receive information as shown in block 408, and the process proceeds as before. In embodiments, this sequence is performed during loading and unloading of passengers 214 and/or cargo 202, or during vehicle 11 travel, such as vehicle flight.

While the foregoing systems and methods represent preferred systems and methods of detecting and calculating the weight and/or center of gravity of a vehicle such as an aircraft, it is to be understood that the scope of the disclosure and claims is not limited to these precise systems and methods, and that modifications may be made to the described systems and methods without departing from the scope of the disclosure and claims.

What is claimed is:

1. A system for determining load distribution of pieces of cargo in a cargo hold of a vehicle, the system comprising:
    a plurality of tags, each of the plurality of tags mounted on a different piece of the pieces of cargo in the cargo hold and carrying information indicative of an actual weight of the different piece of cargo on which a particular tag is mounted;
    a plurality of sensors mounted in a spaced array along a length of the cargo hold, each of the sensors capable of reading from the tags the information indicative of the weights of the pieces of cargo, wherein each of the plurality of sensors is positioned along the length of the cargo hold a known distance from a reference plane, and the sensors are located and adjusted such that each of the sensors reads the information indicative of the weights of the pieces of cargo from less than all of the pieces of cargo; and
    a computer connected to receive from the plurality of sensors the information indicative of the weights and information indicative of the locations of the pieces of cargo in the cargo hold, the computer programmed to:
        calculate therefrom a center of gravity of the plurality of the pieces of cargo;
        approximate a longitudinal location of each of the pieces of cargo from identification of each of the pieces of cargo by specific ones of the sensors, and the known locations of the specific ones of the sensors in the cargo hold; and
        determine a location of a specific piece of cargo to be between a fore-most and an aft-most one of the plurality of sensors detecting the specific piece of cargo in response to an even number of the plurality of sensors detecting the specific piece of cargo.

2. The system of claim 1, wherein the vehicle is selected from an aircraft, a marine vessel, and a land vehicle.

3. The system of claim 1, wherein the computer is programmed to calculate the center of gravity in real time a plurality of times during one or both of cargo loading of the vehicle and cargo unloading of the vehicle.

4. The system of claim 1, wherein the cargo is selected from luggage and unit load devices.

5. The system of claim 1, wherein the tags are radio frequency identification (RFID) tags, and the sensors are RFID interrogators.

6. The system of claim 1, wherein each of the plurality of tags carries information indicative of a weight range of the different piece of cargo on which it is mounted.

7. The system of claim 1, wherein the computer is programmed to actuate an alarm when the center of gravity shifts beyond a predetermined location on the vehicle.

8. The system of claim 1, wherein the computer is programmed to determine a location of a specific piece of cargo to be at a mid-point sensor location of the ones of the plurality of sensors detecting the specific piece of luggage when an odd number of the plurality of sensors detect the specific piece of cargo.

9. The system of claim 1, wherein the computer is programmed to calculate a combined center of gravity of the passengers of the vehicle and the cargo of the vehicle.

10. The system of claim 9, wherein the computer is programmed to calculate the combined center of gravity of the passengers of the vehicle and the cargo of the vehicle a plurality of times during one or both of occupant and cargo loading of the vehicle and occupant and cargo unloading of the vehicle.

11. The system of claim 1, wherein the computer is programmed to calculate a center of gravity of the vehicle utilizing the center of gravity of the dry operating weight of the vehicle, the center of gravity of the weights of all passengers and carry-on baggage on the vehicle, the combined center of gravity of all of the cargo in the cargo hold, and the center of gravity of the total fuel weight.

12. The system of claim 11, wherein the computer is programmed to calculate the center of gravity of the vehicle in real time a plurality of times during one or both of occupant and cargo loading and occupant and cargo unloading.

13. A method of making a system to detect a load distribution of pieces of cargo in a cargo hold of a vehicle, the method comprising:
    selecting a plurality of sensors that read information carried on tags indicative of weights of pieces of cargo on which the tags are mounted;
    mounting the plurality of sensors in a spaced array along a length of the cargo hold, such that each of the sensors is at a known distance from a reference plane of the vehicle;
    connecting a computer to receive from the plurality of sensors the information indicative of the weights and information indicative of the locations of the pieces of cargo in the cargo hold, wherein each of the plurality of sensors is positioned along the length of the cargo hold a known distance from a reference plane, and the sensors are located and adjusted such that each of the sensors reads the information indicative of the weights of the pieces of cargo from less than all of the pieces of cargo; and
    programming the computer to calculate from the information indicative of the weights and information indicative of the locations of the pieces of cargo in the cargo hold:
        a center of gravity of the plurality of the pieces of cargo;
        approximate a longitudinal location of each of the pieces of cargo from identification of each of the pieces of cargo by specific ones of the sensors, and the known locations of the specific ones of the sensors in the cargo hold; and
        determine a location of a specific piece of cargo to be between a fore-most and an aft-most one of the plurality of sensors detecting the specific piece of cargo in response to an even number of the plurality of sensors detecting the specific piece of cargo.

14. The method of claim 13, further comprising:
    selecting the vehicle from an aircraft, a marine vessel, and a land vehicle.

15. The method of claim 13, wherein the computer is programmed to:

calculate the center of gravity in real time a plurality of times during one or both of cargo loading of the vehicle and cargo unloading of the vehicle.

16. The method of claim 13, wherein each of the plurality of tags carries information indicative of a weight range of the different piece of cargo on which it is mounted.

17. The method of claim 13, wherein the computer is programmed to:
actuate an alarm when the center of gravity shifts beyond a predetermined location on the vehicle.

18. The method of claim 13, wherein the computer is programmed to:
determine a location of a specific piece of cargo to be at a mid-point sensor location of the ones of the plurality of sensors detecting the specific piece of luggage when an odd number of the plurality of sensors detect the specific piece of cargo.

19. The method of claim 13, wherein the computer is programmed to:
calculate a combined center of gravity of the passengers of the vehicle and the cargo of the vehicle.

20. The method of claim 19, wherein the computer is programmed to:
calculate the combined center of gravity of the passengers of the vehicle and the cargo of the vehicle a plurality of times during one or both of occupant and cargo loading of the vehicle and occupant and cargo unloading of the vehicle.

* * * * *